UNITED STATES PATENT OFFICE.

SAMUEL R. SCHOLES, OF BEAVER, PENNSYLVANIA, ASSIGNOR TO H. C. FRY GLASS COMPANY, OF ROCHESTER, PENNSYLVANIA, A CORPORATION OF PENNSYLVANIA.

PROCESS OF DECOMPOSING POTASSIUM SILICATES.

1,312,053.     Specification of Letters Patent.     Patented Aug. 5, 1919.

No Drawing.     Application filed November 18, 1918. Serial No. 263,022.

*To all whom it may concern:*

Be it known that I, SAMUEL R. SCHOLES, a citizen of the United States, residing at Beaver, in the county of Beaver and State of Pennsylvania, have invented certain new and useful Improvements in Processes of Decomposing Potassium Silicates; and I do hereby declare the following to be a full, clear, and exact description of the invention, such as will enable others skilled in the art to which it appertains to make and use the same.

This invention relates to a process of treating certain potassium and aluminum silicates, and has for its object to obtain products therefrom in a manner more expeditious and less costly than has been heretofore proposed.

With these and other objects in view the invention consists in the novel steps constituting the process, all as will be more fully hereinafter disclosed and particularly pointed out in the claims.

In order that the precise invention may be the more clearly understood it is said: In my copending application Sr. No. 187211, filed Aug. 20, 1917, entitled Process of obtaining combined potassium from minerals; and in the copending application, Sr. No. 167694, filed May 10, 1917, entitled Process of extracting potassium from potash bearing silicate minerals, filed by myself and Ralph F. Brenner, there are disclosed processes wherein potassium bearing feldspars and similar silicates are treated by melting them with alkalis to glasses. These glasses are ground to a fine state of subdivision and treated with water and carbon dioxid gas; so that the alkali metal compounds present are dissolved as carbonates of sodium and potassium respectively, while a precipitate is left behind consisting of the hydrated oxids of aluminum and silicon. In the practice of the methods just described, which are carried out at atmospheric pressure, there is difficulty experienced in rendering soluble the entire quantity of alkali metal compounds contained in the glass; moreover, the precipitated material, being a mixture of alumina and silica, is not as useful and valuable as these two materials would be if produced separately.

These disadvantages are obviated in the present process now to be disclosed, which is carried out at pressures above that of the atmosphere. In the disclosure of this present process, feldspar (or orthoclase) is taken as a typical silicate of the class amenable to this treatment, but it is understood that leucite, sericite, lepidolite, the micas, or any other like potassium aluminum silicates may be similarly treated. If only alumina, or alumina and silica, are the products sought, kaolin, sillimanite, or other aluminum silicates are suitable raw materials for this process.

In carrying out this invention, I may mix substantially equal parts of ground feldspar and sodium carbonate, and melt the mixture to a glass in a suitable furnace. Potassium carbonate may be used instead of sodium carbonate, and the separation of the two alkalis at the end of the process be thus avoided. But in employing potassium carbonate there is some risk of loss by volatilization, and under some circumstances the sodium carbonate fusion is preferable. More or less of the alkali metal carbonate may be employed. If less than an amount equal in weight to the feldspar is used, the mass requires more fuel in melting, and a longer subsequent treatment in dissolving. If more than the weight of the feldspar is used, there is an unnecessary quantity of material handled throughout the process. If the charge is properly proportioned, on the other hand, the resulting glass, assuming the feldspar to be of average purity, will consist of approximately the following molecular proportions:

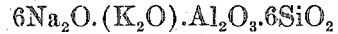

$$6Na_2O.(K_2O).Al_2O_3.6SiO_2$$

This glass is preferably ladled, or poured, while fluid into water, which quenches and granulates the glass so that it is easily crushed and pulverized.

The glass is next ground, preferably while wet, in a suitable mill such as a tube or pebble mill, to a fine state of subdivision. This ground glass is now made into a slurry with water, is then heated in a closed container or digester to preferably about 160° C. corresponding to about 90 pounds steam pressure, for say two hours, more or less. If a lower temperature is employed, a longer time is necessary; but the decomposition will be found to be entirely too slow at 100° C.

I therefore prefer to employ pressures above the atmosphere and temperatures above 100 degrees C. or above 110 degrees C.

By thus subjecting the ground glass to a digester step, instead of to a boiling step at an atmospheric pressure, as heretofore practised, I find that all the said glass is decomposed and the alkali metal compounds present rendered totally soluble which are results not heretofore attained in so far as I am aware.

Further, microscopical examinations show that the sharp particles of glass which were very apparent in the processes of the above mentioned applications, entirely disappear in this process, and that the alumina present is entirely converted into the colloidal state, which are likewise results not heretofore attained in said processes. I then filter the slurry thus obtained by said digestion under pressure, and wash the precipitate until it is substantially free from all soluble alkaline compounds. This washed precipitate will be found to consist of a compound containing alumina. It is a suitable raw material, when properly freed from water, for the manufacture of metallic aluminum, aluminum salts such as alum, glass, refractories, etc.

The filtrate or solution of alkali metal silicates obtained as above is practically a "water glass" and may be sold as such in case the mineral originally treated contains no combined potassium. But when potassium is also present in the mineral, the solution, or filtrate is diluted with water and treated with carbon dioxid or gases containing carbon dioxid, such as flue gases, lime kiln gases, etc. By this means the alkali metals present are converted into carbonates, or bicarbonates, of sodium and potassium while the silica separates as a gelatinous, colloidal precipitate. This precipitate is removed by filtration and washed. It is then suitable for use in any of the manifold commercial applications of pure silica in a finely divided condition. The carbonates of sodium and potassium are found to be present in the filtrates and wash waters. The wash waters are used for dilution of the next batch, so as to avoid evaporating unnecessarily large quantities of water in the next step, and also to dilute the silicate solution and prevent the separation of silica in the form of a too solid jelly.

By evaporating the filtrate to the proper concentration and allowing it to cool, crystals of "washing soda" or the decahydrate of sodium carbonate, $Na_2CO_3.10H_2O$ are obtained in case the original fusion was made with sodium carbonate. The sodium carbonate may now be recovered and removed from the mother liquor, as by a centrifuge when it is ready for fusion with a fresh batch of feldspar.

The solution remaining after the removal of the sodium carbonate contains potassium carbonate which is recovered by further evaporation. The separation of combined sodium and potassium may also be accomplished by carbonating the concentrated solution of their carbonates with carbon dioxid gas or flue gases, etc. Alkali metal bicarbonates are thus formed; and since sodium bicarbonate is much less soluble, it is precipitated, and may be removed by centrifugation or filtering. The sodium bicarbonate thus obtained is entirely equivalent to sodium carbonate for use, as a flux, with which to start the process as set forth.

It will now be clear that the essential features of this process are: Fusion of feldspar with an alkali metal compound, the reduction of the resulting glass to a state of fine subdivision; the digestion of the ground glass thus obtained under superatmospheric pressure, at a temperature above 100° C. with water; the separation of the alumina from the alkali metal silicates solution produced by such digestion; the carbonation of the alkali metal compounds and the precipitation of the silica; the separation of the silica and the alkali metal carbonate solution; the recovery of the alkali metals as carbonates from solution by evaporation, or in the case of sodium as a bicarbonate, by further carbon dioxid treatment.

If desired, the slurry obtained by digestion may be diluted with water and treated at once with carbon dioxid, thereby obtaining alumina and silica as a mixed precipitate.

In the nature of the operations I can vary considerably the details of procedure without departing from the spirit of the invention, and therefore, I do not wish to be limited to the above disclosure except as may be required by the claims.

What I claim is:—

1. The process of extracting a combined alkali metal from silicate minerals containing the same combined with aluminum in an insoluble form, which consists in mixing the finely divided mineral with an alkali metal carbonate; heating the mixture until a glass like mass is formed; finely dividing said glass like mass; and digesting with water said finely divided glass like mass under super atmospheric pressure and at a corresponding temperature exceeding 100° C. to dissolve out the combined alkali metal present, for a time sufficient to convert the alumina into the form of a colloid, substantially as described.

2. The process of extracting combined potassium from aluminum silicate minerals containing the same which consists in mixing with the finely divided mineral a carbonate of an alkali metal; fusing the mixture thus obtained into a glass like mass; finely dividing said mass; digesting said mass with water at a temperature exceeding 100° C., and under super atmospheric pressure, until a substantial portion of the potassium present is dissolved out and a substantial portion of the alumina present appears in the colloidal form; and separating said dissolved potassium from said alumina, substantially as described.

3. The process of extracting combined potassium from aluminum silicates containing the same which consists in mixing with the finely divided mineral a carbonate of an alkali metal; fusing the mixture thus obtained into a glass like mass; finely dividing said mass; digesting said mass with water at a temperature above 110° C., and under super atmospheric pressure, until a substantial portion of the potassium present is dissolved out in the form of a silicate, and a substantial portion of the alumina present appears in the colloidal form; separating said dissolved potassium from said alumina; and recovering the potassium contained in said soluble silicate, substantially as described.

4. The process of extracting combined potassium from minerals containing the same which consists in mixing the finely divided mineral with sodium carbonate; fusing the mixture into a glass; finely dividing the glass; digesting the finely divided glass with water at a temperature exceeding 100° C. and at super-atmospheric pressure until the potassium and sodium present have been dissolved out; separating said dissolved potassium and sodium from the insoluble residue; and separating the dissolved potassium from the dissolved sodium, substantially as described.

5. The process of extracting combined potassium from a feldspar containing the same which consists in fusing said feldspar with a carbonate of an alkali metal; finely dividing the glass like mass thus produced and digesting the same with water at a temperature exceeding 100° C. and at a corresponding pressure to form an alkali metal silicate solution and colloidal alumina; separating said alumina from said solution; and treating said solution with carbon dioxid gas to separate out the silica present, substantially as described.

6. The process of extracting combined potassium from a feldspar containing the same, which consists in fusing said feldspar with a carbonate of sodium; finely dividing the glass like mass thus produced and digesting the same with water at a temperature exceeding 110° C. and at a corresponding pressure to form an alkali metal silicate solution; and colloidal alumina; separating said alumina from said solution; treating said solution with carbon dioxid gas to separate out the silica present; and separating the combined potassium from the combined sodium present, substantially as described.

7. The process of extracting colloidal alumina from a silicate containing the same which consists in fusing said silicate mixed with sodium carbonate into a glass like mass; finely dividing said mass and digesting the same with water at a temperature exceeding 100° C. and under a superatmospheric pressure for a time sufficient to convert a substantial portion of the alumina present into the colloidal form and to provide an alkali metal silicate solution; and separating said alumina from said solution, substantially as described.

In testimony whereof I affix my signature, in presence of a witness.

SAMUEL R. SCHOLES.

Witness:
Lowell W. Nicols.